United States Patent
Xu

(10) Patent No.: US 12,449,939 B2
(45) Date of Patent: Oct. 21, 2025

(54) MULTI-TRAJECTORY BREAKPOINT TRACKING METHOD, SYSTEM, LARGE DISPLAY SCREEN, AND READABLE STORAGE MEDIUM

(71) Applicant: SHENZHEN HITEVISION TECHNOLOGY CO., LTD., Guangdong (CN)

(72) Inventor: Xiezeng Xu, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/874,098

(22) PCT Filed: Dec. 13, 2022

(86) PCT No.: PCT/CN2022/138642
§ 371 (c)(1),
(2) Date: Dec. 12, 2024

(87) PCT Pub. No.: WO2024/087344
PCT Pub. Date: May 2, 2024

(65) Prior Publication Data
US 2025/0165102 A1    May 22, 2025

(30) Foreign Application Priority Data
Oct. 27, 2022  (CN) .......................... 202211326692.X

(51) Int. Cl.
*G06F 3/041*  (2006.01)
(52) U.S. Cl.
CPC ................................ *G06F 3/04186* (2019.05)
(58) Field of Classification Search
CPC ................................................... G06F 3/04186
See application file for complete search history.

(56) References Cited

U.S. PATENT DOCUMENTS

| | | | |
|---|---|---|---|
| 2010/0073318 A1* | 3/2010 | Hu | G06F 3/04186 345/174 |
| 2010/0309139 A1* | 12/2010 | Ng | G06F 3/04186 345/173 |

(Continued)

FOREIGN PATENT DOCUMENTS

| | | |
|---|---|---|
| CN | 105573538 A | 5/2016 |
| CN | 105955525 A | 9/2016 |

(Continued)

OTHER PUBLICATIONS

The International search report for PCT Application No. PCT/CN2022/138642, dated Feb. 21, 2023, 4 pages.

*Primary Examiner* — Chun-Nan Lin
(74) *Attorney, Agent, or Firm* — East IP P.C.

(57) ABSTRACT

The present application relates to a multi-trajectory breakpoint tracking method, system, large screen or computer-readable storage medium, which comprises: an obtaining step: receiving a current touch signal for tracking a current trajectory group and obtaining a plurality of current touch points according to the current touch signal; a determination step: determining whether each of the current trajectories in the current trajectory group has a matched current touch point or not; a compensation step: determining a current-round classification group which a trajectory vector of the breakpoint trajectory is in, determining a compensation point matching the breakpoint trajectory, and determining the compensation point matched with the breakpoint trajectory; an update step: adding each of the last trajectory points to the current trajectory matched therewith.

19 Claims, 6 Drawing Sheets

(56) References Cited

U.S. PATENT DOCUMENTS

2014/0055421 A1* 2/2014 Christiansson ..... G06F 3/04186
　　　　　　　　　　　　　　　　　　　　　　345/175
2014/0375607 A1* 12/2014 Christiansson ....... G06F 3/0418
　　　　　　　　　　　　　　　　　　　　　　345/174

FOREIGN PATENT DOCUMENTS

| CN | 108073329 A | 5/2018 |
| CN | 108132727 A | 6/2018 |
| WO | 2015131675 A1 | 9/2015 |

* cited by examiner

MULTI-TRAJECTORY BREAKPOINT TRACKING METHOD, SYSTEM, LARGE DISPLAY SCREEN, AND READABLE STORAGE MEDIUM

CROSS REFERENCE TO RELATED APPLICATION

The present application is a national application of International Application No. PCT/CN2022/138642 filed on Dec. 13, 2022, which claims priority to Chinese Patent Application No. 202211326692.X filed on Oct. 27, 2022, and titled "MULTI-TRAJECTORY BREAKPOINT TRACKING METHOD, SYSTEM, LARGE DISPLAY SCREEN, AND READABLE STORAGE MEDIUM", both of which are incorporated herein by reference in their entireties.

TECHNICAL FIELD

The present application relates to the technical field of electronic devices, and in particular to a multi-trajectory breakpoint tracking method, system, large display screen, and readable storage medium.

BACKGROUND

Existing electronic devices, for example interactive large display screen, normally have the function of multi-trajectory drawing. During the multi-trajectory drawing, the electronic devices periodically obtain a current touch point, transfer the touch point to a trajectory point, match each of these trajectory points with a corresponding historical trajectory, and link the matching historical trajectory with the trajectory points, thereby updating each trajectory.

SUMMARY

Embodiments of the present application provide a multi-trajectory breakpoint tracking method, comprising:
  an obtaining step: receiving a current touch signal for tracking a current trajectory group and obtaining a plurality of current touch points according to the current touch signal, wherein the current trajectory group comprises a plurality of current trajectories;
  a determination step: determining whether each of the current trajectories in the current trajectory group has a matched current touch point or not, and taking each of the current touch points as a last trajectory point of the current trajectory matched therewith if it is determined that each of the current trajectories in the current trajectory group has a matched current touch point; otherwise, determining that the current trajectory having no matched current touch point is a breakpoint trajectory and executing a compensation step;
  the compensation step: determining a current-round classification group which a trajectory vector of the breakpoint trajectory is in, determining a compensation point matching the breakpoint trajectory according to at least one of the current trajectories having the matched current touch point in the current-round classification group and the current touch point matched therewith, and taking the compensation point as a last trajectory point of the breakpoint trajectory;
  wherein the trajectory vector is a vector determined by the last two trajectory points of the current trajectory where the trajectory vector is from, the plurality of current trajectories in the current trajectory group form at least one current-round classification group, the trajectory vectors in a same current-round classification group form an association chain, and any two adjacent trajectory vectors in the association chain satisfy a preset condition comprising that: the last trajectory points of two current trajectories corresponding to the two current trajectory vectors are located in a first preset area, and a difference of the two current trajectory vectors is located in a second preset area; and
  an update step: adding each of the last trajectory points to the current trajectory matched therewith to update the current trajectory group, and returning to the obtaining step.

In an embodiment, in the compensation step, under a condition that the current-round classification group which the trajectory vector of the breakpoint trajectory is in has a plurality of the current trajectories matched the current touch point, the determining a compensation point comprises: for each of the matched current trajectories, forming a calculation vector according to the last trajectory point of the matched current trajectory and the current touch point matched therewith; calculating a mean value of the calculation vectors as a tracking vector; and taking a start point of the tracking vector as a current last trajectory point of the breakpoint trajectory and taking an end point of the tracking vector as the compensation point of the breakpoint trajectory.

In an embodiment, a grouping method of the current-round classification group comprises: selecting two trajectory vectors satisfying the preset condition from the trajectory vectors that are not grouped, and grouping the two trajectory vectors into one current-round classification group; selecting other trajectory vectors one by one, and adding any one of the other trajectory vectors to the current-round classification group if it is determined that such a trajectory vector is able to satisfy the preset condition with reference to at least one of the trajectory vectors in the current-round classification group; otherwise, taking it as the trajectory vector that is not grouped.

In an embodiment, a grouping method of the current-round classification group comprises: forming a current-round preliminary group excluding the current trajectory; that has the compensation point as the last trajectory point, selecting two trajectory vectors satisfying the preset conditions from the trajectory vectors that are not grouped in the current-round preliminary group, and grouping the two trajectory vectors into one current-round classification group; selecting other trajectory vectors in the current-round preliminary group one by one, and adding any one of the other trajectory vectors to the current-round classification group if it is determined that such a trajectory vector is able to satisfy the preset condition with reference to at least one of the trajectory vectors in the current-round classification group; otherwise, taking it as the trajectory vector that is not grouped; determining a last-round classification group which the current trajectory having the compensation point as the last trajectory point is in, and comparing the last-round classification group with the current-round classification group, determining the current-round classification group having the highest similarity with the last-round classification group, and adding the current trajectory having the compensation point as the last trajectory point to the current-round classification group having the highest similarity with the last-round classification group; wherein the last-round classification group is one of the current-round classification groups in a last round.

In an embodiment, it is determined that the last trajectory points of two current trajectories corresponding to two trajectory vectors is located in the first preset area if the two current trajectories corresponding to the two trajectory vectors satisfy the following condition: an absolute value of the difference between X coordinates of the two last trajectory points is less than or equal to a first preset value, and an absolute value of the difference between Y coordinates of the two last trajectory points is less than or equal to a second preset value.

In an embodiment, it is determined that two current trajectory vectors are in the second preset area, if a vector difference between the two current trajectory vectors satisfy the following condition: a magnitude of an x-component of the vector difference between the two trajectory vectors is less than or equal to a third preset value, and a magnitude of a y-component of the vector difference is less than or equal to a fourth preset value.

In an embodiment, before the compensation step, further comprising: a determination step for a terminated trajectory: determining whether a preset number of last trajectory points of each of the breakpoint trajectories are the compensation point or not, and taking any one of the breakpoint trajectories as a terminated trajectory if it is determined that the preset number of last trajectory points of such a breakpoint trajectory all are the compensation point and performing the compensation step on the other breakpoint trajectories; or performing directly the compensation step if it is determined that none of the breakpoint trajectories have a preset number of last trajectory points that are the compensation point; and wherein the update step comprises eliminating the terminated trajectory, adding each last trajectory point to the current trajectory matched therewith, displaying the tracked trajectory of the current trajectory, updating the current trajectory group, and returning to the obtaining step.

The present application further relates to a multi-trajectory breakpoint processing system. The multi-trajectory breakpoint processing system comprises a processor, a memory and computer program modules stored in the memory and runnable on the processor, wherein the computer program modules comprise:

an obtaining module for receiving the current touch signal for tracking the current trajectory group and obtaining the plurality of current touch points according to the current touch signal, wherein the current trajectory group comprises a plurality of current trajectories;

a determination module for determining whether each of the current trajectories in the current trajectory group has the matched current touch point or not, and taking each of the current touch points as the last trajectory point of the current trajectory matched therewith if it is determined that each of the current trajectories in the current trajectory group has the matched current touch point; otherwise, determining that the current trajectory having no matched current touch point is the breakpoint trajectory;

a compensation module for determining the current-round classification group which the trajectory vector of the breakpoint trajectory is in, determining the compensation point matching the breakpoint trajectory according to at least one of the current trajectories having the matched current touch point in the current-round classification group and the current touch point matched therewith, and taking the compensation point as the last trajectory point of the breakpoint trajectory;

an update module for adding each of the last trajectory points to the current trajectory matched therewith to update the current trajectory group, and returning to the obtaining step;

wherein the obtaining module, the compensation module and the update module each are connected with the determination module.

The present application further relates to an interactive large display screen comprising the above multi-trajectory breakpoint processing system.

The present application further relates to a non-transient computer-readable storage medium, having an executable program stored thereon, which performs the above breakpoint tracking method when the executable program is executed.

BRIEF DESCRIPTION OF THE DRAWINGS

Preferred embodiments of a multi-trajectory breakpoint tracking method, system, large display screen, and readable storage medium of the present application will be described below with reference to the accompanying drawings, in which.

Figure 1:
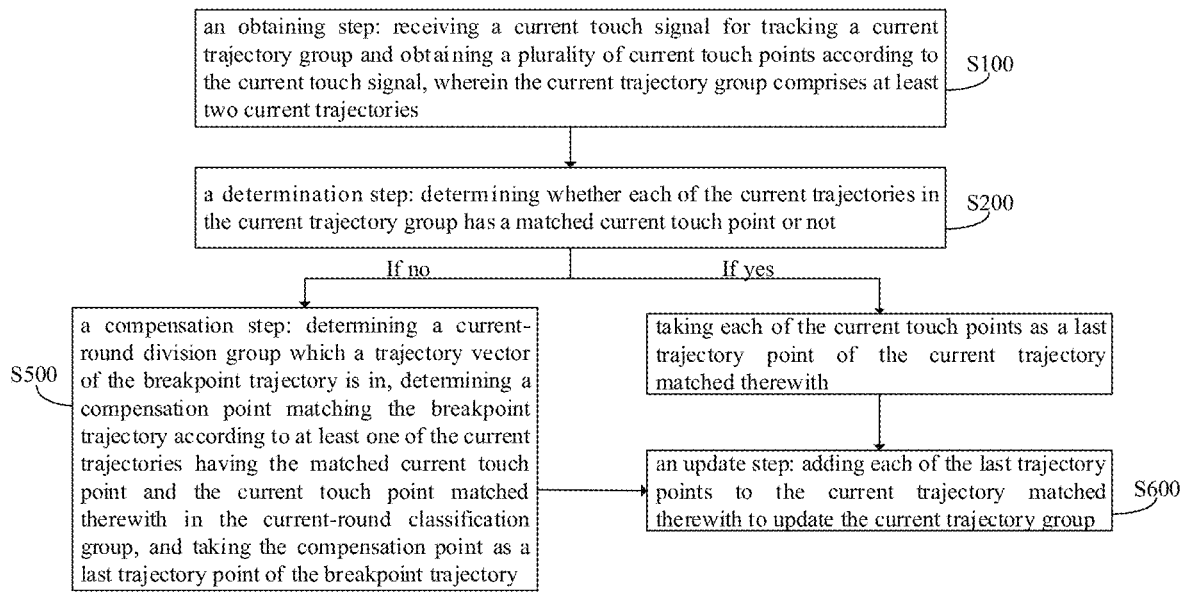
FIG. 1 shows a schematic flow diagram of a multi-trajectory breakpoint tracking method.

In the drawings: 1, first preset area; 2, second preset area.

DETAILED DESCRIPTION

In the following, the present application is described based on embodiments, but not merely limited to these embodiments. In the detailed description of the present application below, some specific details are described in detail. Methods, processes, flows and elements known in the art are not described in detail so as to avoid obscuring the substance of the present application.

Furthermore, those skilled in the art may understand that the figures are provided herein for descriptive purpose, and are not necessarily drawn to scale.

Unless clearly indicated otherwise in the context, the wording "comprises", "comprising" and the like shall be construed in an inclusive sense throughout the specification and claims, instead of an exclusive or exhaustive sense. That is to say, it shall be construed as "including, but not limited to".

It should be understand that in the description of the present application, the terms "first", "second" and the like are merely intended to a descriptive purpose, and cannot be interpreted as indicating or implying relative importance. In addition, unless otherwise specified in the description of this application, "a plurality of" means two or more.

The present application relates to various allowed and reasonable orders that may be determined by those skilled in the art according to the technology itself.

Those skilled in the art may understand that the above preferred solutions may be freely combined and superimposed without conflict.

Referring to FIGS. 1-11, the present application relates to a multi-trajectory breakpoint tracking method applied to an electronic device with a touch control function, for example, an interactive display screen, an electronic whiteboard and the like. The electronic device may be capable of recording multiple trajectories by multi-touch. For example, when five fingers of the user draw lines on the interactive display screen simultaneously, five current trajectories may be displayed on the interactive display screen, and each current trajectory corresponds to the drawing trajectory of one finger. Referring to FIG. 1, the breakpoint tracking method comprises:

S100, an obtaining step: receiving a current touch signal for tracking a current trajectory group and obtaining a plurality of current touch points according to the current touch signal, wherein the current trajectory group comprises a plurality of current trajectories;

S200, a determination step: determining whether each of the current trajectories in the current trajectory group has a matched current touch point or not, and taking each of the current touch points as a last trajectory point of the current trajectory matched therewith if it is determined that each of the current trajectories in the current trajectory group has a matched current touch point; otherwise, determining that the current trajectory having no matched current touch point is a breakpoint trajectory and executing a compensation step;

S500, a compensation step: determining a current-round classification group which a trajectory vector of the breakpoint trajectory is in, determining a compensation point matching the breakpoint trajectory according to at least one of the current trajectories having the matched current touch point in the current-round classification group and the current touch point matched therewith, and taking the compensation point as a last trajectory point of the breakpoint trajectory;

wherein the trajectory vector is a vector determined by the last two trajectory points of the current trajectory where the trajectory vector is from; the plurality of current trajectories in the current trajectory group form at least one current-round classification group, the trajectory vectors in the same current-round classification group form an association chain, and any two adjacent trajectory vectors in the association chain satisfy a preset condition comprising that: the last trajectory points of two current trajectories corresponding to the two current trajectory vectors are located in a first preset area 1, and a difference of the two current trajectory vectors is located in a second preset area 2; and S600, an update step: adding each of the last trajectory points to the current trajectory matched therewith to update the current trajectory group, and returning to the obtaining step.

In the present application, the electronic device has an axis, and each current touch point and each trajectory point of the current trajectory have corresponding coordinates on the axis. In order to facilitate the understanding of the present application, the trajectory points and the current touch points are referred to as black round points in FIGS. 2, 4, 5, 7-9, and it does not represent that these trajectory points and the current touch points are black round points in the practical applications.

In step S100, the electronic device periodically scans the touch signal thereon, and transfers the touch signal to the touch point. Taking a current trajectory as an example, the current trajectory is formed by linking these touch points in a chronological sequence. In some embodiments of multiple current trajectories, the electronic device can receive a plurality of touch signals in each scan period, and transfer the plurality of touch signals to a plurality of current touch points.

In step S200, there are a plurality of current trajectories and a plurality of current touch points on the electronic device, and the number of the current touch points may be equal to the number of the current trajectory or not. The plurality of current trajectories are matched with the plurality of current touch points by any available multi-trajectory drawing method; for example, the matching may be performed in the following two ways:

Way 1: calculating the distance between the current touch point and the last trajectory point of each current trajectory, with the smaller distance indicating the higher matching degree; or Way 2: calculating a deviation angle between a trend of each current trajectory and the current trajectory point, with the smaller deviation angle indicating the higher matching degree, wherein the trend of the current trajectory refers to a linking direction of the last two trajectory points of the current trajectory (the direction pointing toward the last trajectory point from the last but one trajectory point). Therefore, one current touch point may be matched with one current trajectory.

Typically, each current trajectory can be matched with one current touch point, but for some reasons stated in the background of the present application, some current trajectories cannot be matched with the current touch points. For the convenience of description, the current trajectory that cannot be matched with the current touch point is referred to as a breakpoint trajectory, and the current trajectory that can be matched with the current touch point is referred to as a point-linking trajectory. Therefore, in step S200, it is determined whether there is a breakpoint trajectory in the current trajectories or not; if there is a breakpoint trajectory, step S500 is performed, and if there is no breakpoint trajectory, step S600 is performed.

Figure 2:
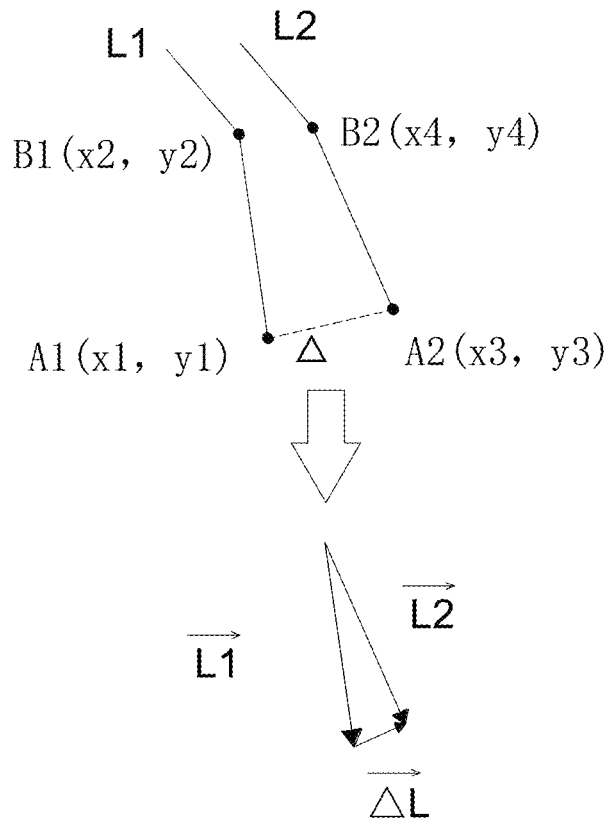
FIG. 2 shows a schematic diagram of $\Delta$ and $\overrightarrow{\Delta L}$ of two current trajectories.
Figure 3:
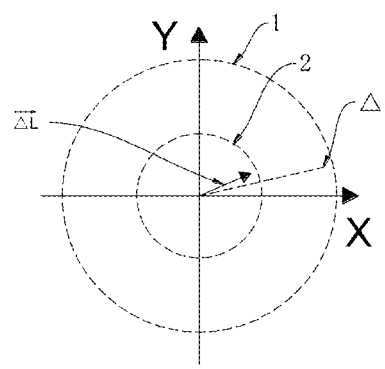
FIG. 3 shows a schematic diagram of two trajectory vectors satisfying the preset condition.

Referring to FIG. 2 and FIG. 3, there is the current-round classification group step S300 before performing step S500. This is, all trajectories are divided according to a trajectory vector of each current trajectory, so that the current trajectories having close trends are in the same current-round classification group. Specifically, the trajectory vector is determined by the last two trajectory points of the current trajectory. Taking one of the current trajectories as an example, the coordinate of the last one trajectory point (the trail trajectory point) of the current trajectory is (x1, y1), the coordinate of the last but one trajectory point (the previous trajectory point) of the current trajectory is (x2, y2), so the trajectory vector of the current trajectory is (x1−x2, y1−y2); by "close trends" it is meant that two current trajectories satisfy a preset condition which comprises a first sub-condition and a second sub-condition, wherein the first sub-condition is that the last trajectory points of the two current trajectories corresponding to the two trajectory vectors are located in a first preset area 1, and the second sub-condition is that the difference of the two trajectory vectors is located in a second preset area 2. For example, the two current trajectories are a first trajectory L1 and a second trajectory L2, the coordinate of the trail trajectory point of the first trajectory is A1 (x1, y1), the coordinate of the previous trajectory point of the first trajectory is B1 (x2, y2), the coordinate of the trail trajectory point of the second trajectory is A2 (x3, y3), and the coordinate of the previous trajectory point of the second trajectory is B2 (x4, y4), so the difference of the two trail trajectory points is A (x3−x1, y3−y1), wherein if A is in the first preset area 1, the two current trajectories satisfy the first sub-condition; otherwise the two current trajectories do not satisfy the first sub-condition, where the first preset area 1 may be a rectangular area, a circular area or an elliptical area, and the central point of the first preset area 1 is located at the origin of the axis; the trajectory vector of the first trajectory is $\vec{L1}$ (x1−x2, y1−y2), the trajectory vector of the second trajectory is $\vec{L2}$ (x3−x4, y3−y4), the trajectory vector difference of the two current trajectories is $\vec{\Delta L}$ (x3−x4−x1+x2, y3−y4−y1+y2), the start point of the trajectory vector difference is set to be the origin, and the central point of the second preset area 2 is set to be the origin, wherein if the end point of the trajectory vector difference is located in the second preset area 2, the two current trajectories satisfy the second sub-condition, otherwise the two current trajectories do not satisfy the second sub-condition, where the second preset area may be a rectangular area, a circular area or an elliptical area. That the two current trajectories satisfy the preset condition means that the two current trajectories satisfy both the first sub-condition and the second sub-condition.

Figure 4:
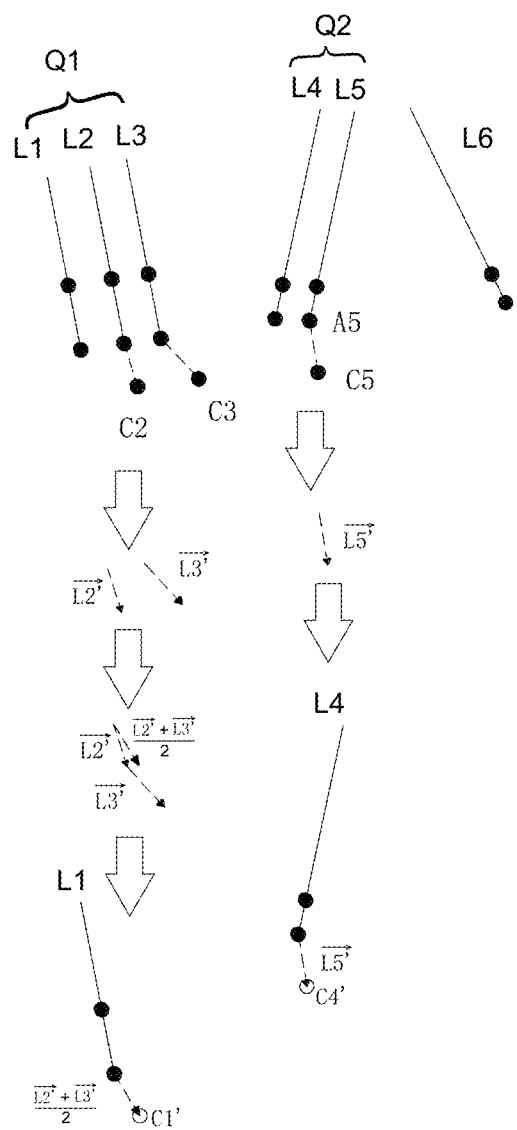
FIG. 4 shows a first schematic diagram of estimating a compensation point of a breakpoint trajectory.

In turn, any two of the current trajectories may be determined in the manner described above to form an association chain between two current trajectories that satisfy the preset condition, so that all current trajectories connected by the association chain may be grouped into a same current-round classification group in order to obtain at least one current-round classification group. In practical applications, any two of the current trajectories may not form an association chain. For example, as shown in FIG. 4, there are six current trajectories L1, L2, L3, L4, L5, and L6, wherein L1 forms an association chain with L2, L2 also forms an association chain with L3, L4 forms an association chain with L5 only, and L6 does not form an association chain with any one of the current trajectories. Therefore, L1, L2 and L3 form a current-round classification group Q1, L4 and L5 form a current-round classification group Q2, and L6 is a separate current trajectory that is not in any one of the current-round classification groups.

In step S500, when a breakpoint trajectory exists, a current-round classification group which the breakpoint trajectory is in is determined, and a compensation point of the breakpoint trajectory is determined according to at least one point-linking trajectory in the current-round classification group. Specifically, the compensation point of the breakpoint trajectory is determined according to the current touch point of the point-linking trajectory. Still taking the embodiment shown in FIG. 4 as an example, if L4 is a breakpoint trajectory, it is determined that L4 is in the current-round classification group Q2; the compensation point of L4 may be determined according to the point-linking trajectory in the current-round classification group Q2; the point-linking trajectory in the current-round classification group Q2 is L5, the current touch point of which is C5. Therefore, the calculation vector of $\vec{L5}$ may be calculated. For example, the original coordinate of the trail trajectory point of L5 is A5 (x5, y5); the coordinate of the current touch point of L5 is C5 (x6, y6); therefore, the calculation vector of L5 may be calculated to be $\vec{L5}$, (x6−x5, y6−y5); the start point of the calculation vector $\vec{L5}$, is moved to the trail trajectory point of L4; meanwhile, the end point of the calculation vector $\vec{L5'}$, is the compensation point of L4, so that the compensation point C4′ matched with the breakpoint trajectory may be determined.

It may be seen that in the present application, the current trajectories having close trends are set into the same current-round classification group by step S300. When a breakpoint trajectory and a point-linking trajectory are present in the current-round classification group, the compensation point of the breakpoint trajectory in the current-round classification group is calculated according to the point-linking trajectory in the current-round classification group by step S500. Furthermore, if the breakpoint trajectory does not belong to any one of the current-round classification groups, the compensation point may not be calculated by the breakpoint tracking method of the present application. This is to say, the present application is not intended to deal with the situation that each current trajectory in the current-round classification group is a breakpoint trajectory or the breakpoint trajectory is not in any one of the current-round classification groups. Instead, the present application is aimed at the problem of determining the compensation of a breakpoint trajectory when the breakpoint trajectory together with a point-linking trajectory exists in the current-round classification group.

In addition, step S300 may be performed selectively, or may be performed each time a current touch point is obtained. Specifically, in embodiments where step S300 is performed selectively, if it is determined that a breakpoint trajectory exists after step S200, then step S300 is performed to divide the current trajectories for facilitating matching the compensation point of the breakpoint trajectory in step S500; if it is determined that a breakpoint trajectory does not exist in step S200, then there is no need to perform step S300. Therefore, determining whether a breakpoint trajectory exists may be the triggering condition of performing step S300. If the breakpoint trajectory exists, then step S300 is performed; if the breakpoint trajectory does not exist, then step S600 is performed.

In an embodiment where step S300 is performed each time a current touch point is obtained, after each current touch point is matched with the current trajectory, the current touch point is transformed to the trail trajectory point of the current trajectory; the original trail trajectory point of the current trajectory is transformed to the previous trajectory point of the current trajectory; therefore, at this time the current trajectories matched with the current touch points may be grouped. It may be seen that the current trajectories need to be re-grouped as the current touch point is transformed to the trail trajectory point of the current trajectory, so that the current-round classification groups are changed as the current trajectories change. Furthermore, in the embodiment, step S300 may be performed before step S100, i.e., the current trajectories may be divided first, and then step S100 is performed. Step S300 may be performed synchronously with step S100 or may be performed synchronously with step S200, provided that step S300 is performed before step S500 (if step S500 exists).

Furthermore, in step S500, the compensation point serves as the last trajectory point of the breakpoint trajectory. This is to say, after the compensation point of the breakpoint trajectory is calculated, the compensation point is taken as the trail trajectory point of the breakpoint trajectory, and the original trail trajectory point of the breakpoint trajectory is taken as the previous trajectory point of the breakpoint trajectory; therefore, a new trail trajectory point (the trail trajectory point of the point-linking trajectory is its current touch point) and a new previous trajectory point (i.e., the original trail trajectory point of the current trajectory) are obtained for each current trajectory, thereby enabling a corresponding last trajectory point to be obtained for each current trajectory.

In step S600, for the point-linking trajectory, it has a matched current touch point, therefore the current matched touch point is referred to as its trail trajectory point, and is linked with its original trail trajectory point, so that the point-linking trajectory is updated (changing as the current touch signal updates). for the breakpoint trajectory, in an embodiment, the compensation point may be displayed by an electronic device, and the compensation point is linked with the original trail trajectory point of the breakpoint trajectory, so that the breakpoint trajectory is updated on time; in another embodiment, the electronic device may not be display the compensation point, only by recording the coordinate of the compensation point, therefore the breakpoint trajectory is not linked with the compensation point.

In the present application, the current trajectories having close trends are set in a same current-round classification group by grouping the current trajectories. Therefore, when a breakpoint trajectory exists in the current-round classification group, the compensation point of the breakpoint trajectory may be calculated from the current touch point of the point-linking trajectory in the current-round classification group. As a result, after it is determined that the breakpoint trajectory is not the real breakpoint point, it is convenient for the breakpoint trajectory to be complemented completely by the compensation point, so that the occurrence of an accidental breakpoint is avoided.

In the specific process of determining the compensation point, the compensation point may be determined by the current touch point of all point-linking trajectories in the current-round classification group, or may be determined only by the current touch point of some point-linking trajectories in the current-round classification group.

In an embodiment where the compensation point is determined by the current touch point of all point-linking trajectories in the current-round classification group, in step S500, when there are a plurality of current trajectories, which are matched with the current touch point, in the current-round classification group where the trajectory vector of the breakpoint trajectory is located, the determination method of the compensation point comprises:
  for each of the matched current trajectories, forming a calculation vector according to the last trajectory point of the matched current trajectory and the current touch point matched with the matched current trajectory;
  calculating the mean value of each calculation vector as a tracking vector;
  taking a start point of the tracking vector as a current last trajectory point of the tracking vector and taking the end point of the tracking vector as the compensation point of the breakpoint trajectory.

Taking an embodiment shown in FIG. 4 as an example, if L1 is the breakpoint trajectory, and the current-round classification group where L1 is located is Q1, then the compensation point of L1 is determined according to the point-linking trajectories L2 and L3 in Q1; the current touch point of L2 is C2, and the current touch point of L3 is C3; therefore, the calculation vector of $\overrightarrow{L2'}$, of L2 and the calculation vector $\overrightarrow{L3'}$, of L3 may be calculated, and the specific calculating process may reference the calculating process of the above $\overrightarrow{L5'}$, so the details will not be repeated here; the tracking vector is referred to as the mean value $$\frac{\overrightarrow{L2'} + \overrightarrow{L3'}}{2}$$

(calculating the mean vector) of $\overrightarrow{L2'}$ and $\overrightarrow{L3'}$, and the start point of the tracking vector is set to the trail trajectory point of the breakpoint trajectory, and the end point of the tracking vector is the compensation point C1' of L1.

In practical applications, multiple trajectories are often formed by the user's fingers swiping on an electronic device, and therefore the trends (the calculation vectors) of trajectories in the same current-round classification group is substantially identical or not largely different in practice. The mean value of the calculation vector of all the point-linking trajectory in the current-round classification group is referred to as the compensation point of the breakpoint trajectory, so that the compensation point of the breakpoint trajectory is obtained, the compensation point of the breakpoint trajectory is associated with the calculation vector of all the point-linking trajectory in the current-round classification group, the trend of the breakpoint trajectory is close to the trends of other point-linking trajectories in the current-round classification group, and the compensation point of the breakpoint trajectory is close to the actual breakpoint.

In an embodiment where the current touch point is determined by the compensation point by dividing some point-linking trajectories in the current-round classification group, in step S500, when there are a plurality of current trajectories matching the current touch point in the current-round classification group where the trajectory vector of the breakpoint trajectory is located, the method for determining the compensation point includes:
  forming a calculation vector according to the point-linking trajectory that is directly connected with the breakpoint trajectory by the association chain and the current touch point matched therewith;
  calculating the mean value of each calculation vector as a tracking vector;
  determining the compensation point according to the tracking vector and the last trajectory point (the trail trajectory point) of the breakpoint trajectory, taking a start point of the tracking point as a current last trajectory point, taking an end point of the tracking point as a compensation point of the breakpoint trajectory.

Figure 5:
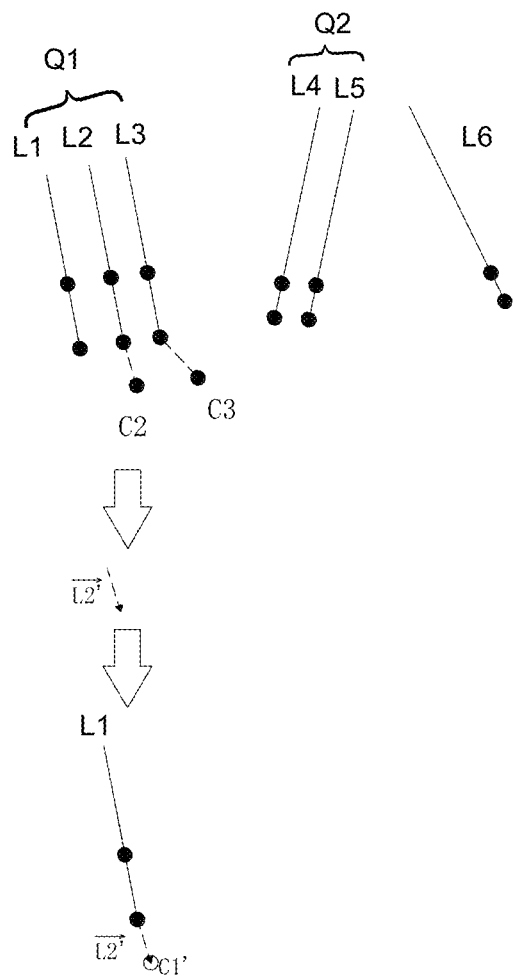
FIG. 5 shows a second schematic diagram of estimating a compensation point of a breakpoint trajectory.

Using an embodiment shown in FIG. 5 as an example, if L1 is the breakpoint trajectory, and the current-round classification group where L1 is located is Q1, in Q1, L1 and L2 form an association chain (i.e., L1 and L2 are connected by the association chain); L2 and L3 are connected by the association chain, but L1 and L3 are not directly connected by the association chain; therefore, when the compensation point of L1 is determined, because only the point-linking trajectory L2 and the breakpoint trajectory L1 are directly connected by the association chain, the calculation vector $\vec{L2'}$ of L2 is calculated according to the current touch point C2 of L2; because only one effective calculation vector exists, the calculation vector is the tracking vector, so that the compensation point C1' of L1 is obtained.

The tracking vector is obtained from the calculation vector of the point-linking trajectory that is directly connected with the breakpoint trajectory by the association chain, so there is no need to obtain the calculation vector of each point-linking trajectory in the current-round classification group. Therefore, the difficulty of the calculation process of the tracking vector is decreased, and the requirement of the computational power of the electronic device is reduced, so that the determination of the compensation point is speeded up.

In step S300, the method for dividing the current-round classification group comprises:

selecting two trajectory vectors satisfying the preset condition from the trajectory vectors that are not grouped, and grouping the two trajectory vectors into one current-round classification group;

selecting other trajectory vectors one by one and adding any one of the other trajectory vectors to the current-round classification group if it is determined that such a trajectory vector is able to satisfy the preset condition with reference to at least one of the trajectory vectors in the current-round classification group; otherwise, taking it as the trajectory vector that is not grouped.

Referring to FIG. 5, during the classification, L1 and L2 are determined first whether the preset condition is satisfied or not; the determination result is yes, and L1 and L2 are divided into the current-round classification group Q1, and then L3, L4, L5 and L6 are respectively determined with L1 whether the preset condition is satisfied or not; all results are no, and then L3, L4, L5 and L6 are respectively determined with L2 whether the preset condition is satisfied or not; the result is that L3 and L2 satisfy the preset condition, and L3 is added to the current-round classification group Q1; meanwhile, the current trajectories that are not added to the current-round classification group are L4, L5 and L6; L4 and L5 are determined to satisfy the preset condition, and then L4 and L5 are divided into the current-round classification group Q2; L6 and L4 are determined, and L6 and L5 are determined, and all the determination results do not satisfy the preset condition; the current trajectory that is not added to the current-round classification group is only L6; therefore, the current-round classification groups obtained at last are Q1 and Q2, wherein Q1 includes L1, L2 and L3, and Q2 includes L4 and L5, and L6 is an individual current trajectory that is not in any one of the current-round classification groups.

According to the method, all current trajectories may be grouped, so that the current trajectories with close trends are grouped into the same current-round classification group, and the coordinate of the compensation point obtained in step S500 may be more accurate.

In another embodiment, the method for dividing the current-round classification group comprises:

taking each current trajectory as an active trajectory in turn, while taking any other current trajectory excluding the active trajectory as a passive trajectory;

comparing the trajectory vector of each passive trajectory with the trajectory vector of the active trajectory one by one to determine whether the preset condition is satisfied;

dividing the passive trajectory or trajectories satisfying the preset condition and the active trajectory into one current-round classification group.

Figure 7:
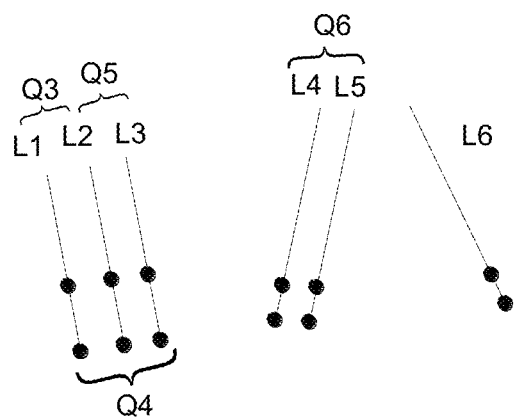
FIG. 7 shows a schematic diagram of a current-round classification group.

Referring to an embodiment shown in FIG. 7, L1 is taken as the active trajectory, L2-L6 are taken as the passive trajectory, and the determination is made for L2-L6 one by one with reference to L1; only L2 and L1 satisfy the preset condition through the determination, and therefore L1 and L2 are divided into one same current-round classification group; then L2 is taken as the active trajectory, L1, L3-L6 are taken as the passive trajectories, and the determination is made for the passive trajectories one by one with reference to the active trajectory, finding that L2 and L1 satisfy the preset condition, and L2 and L3 satisfy the preset condition, so L1, L2 and L3 are divided into one same current-round classification group. Likewise, L3-L6 each are taken as the active trajectory to made the determination for the corresponding passive trajectories. Finally, L1 and L2 are grouped into the current-round classification group Q3; L1, L2 and L3 are grouped into the current-round classification group Q4; L2 and L3 are grouped into the current-round classification group Q5; L4 and L5 are grouped into the current-round classification group Q6; L6 does not belong to any one of the current-round classification groups. It may be seen that each current-round classification group has an active trajectory, and the trajectory vector of any other current trajectory in the current-round classification group forms an association chain (satisfying the preset condition) with the trajectory vector of the active trajectory. For example, L1 is the active trajectory in Q3; L2 is the active trajectory in Q4; L3 is the active trajectory in Q5; L4 and L5 are the active trajectories with respect to each other in Q6.

Further, in step S500, "the current-round classification group" in "determining the current-round classification group which the trajectory vector of the breakpoint trajectory is in" means that such a current-round classification group where the breakpoint trajectory is taken as the active trajectory. For example, if the breakpoint trajectory is L1, then the current-round classification group is Q3; if the breakpoint trajectory is L2, the current-round classification group is Q4; if the breakpoint trajectory is L3, the current-round classification group is Q5; if any one of L4 and L5 is the breakpoint trajectory, the current-round classification group is Q6.

Therefore, the size of each current-round classification group is reduced; the difficulty of the calculation process of the trajectory vector in step S500 is reduced; the requirement on the computational power of the electronic device is reduced; and the determination of the compensation point is accelerated.

For step S300, in foregoing embodiments, each round of the classification is to classify all the current trajectories, i.e., even if there may be a breakpoint trajectory in the current trajectory during the classification (before the current touch point is obtained), the compensation points of the breakpoint trajectory are taken together as the trail trajectory point of the breakpoint trajectory; since the compensation point is an estimated point, in another embodiment, during the classification, the breakpoint trajectory (the breakpoint trajectory of the previous round) may be excluded, where step S300 specifically comprises:

forming a current-round preliminary group excluding the current trajectory; that has the compensation point as the last trajectory point, selecting two trajectory vectors satisfying the preset conditions from the trajectory vectors that are not grouped in the current-round preliminary group, and grouping the two trajectory vectors into one current-round classification group;

selecting, one by one, other trajectory vectors in the current-round preliminary group, and adding any one of the other trajectory vectors to the current-round classification group; otherwise, taking it as the trajectory vector that is not grouped;

determining a last-round classification group which the current trajectory having the compensation point as the last trajectory point is in, and comparing the last-round classification group with the current-round classification group, determining the current-round classification group having the highest similarity with the last-round classification group, and adding the current trajectory having the compensation point as the last trajectory point to the current-round classification group, where the last-round classification group is one of the current-round classification groups in a last round.

In current-round classification grouping, the current trajectories may be all point-linking trajectories or may comprise a breakpoint trajectory; if the current trajectories all are the point-linking trajectory, the method of the present embodiment uses substantially the same classification method as used in the foregoing embodiments, but if the current trajectories comprise the breakpoint trajectory (the breakpoint trajectory herein means the current trajectory for which no current touch point is obtained in the last round, i.e., the current trajectory of which the last trajectory point is the compensation point), in the present embodiment, the breakpoint trajectory in the current trajectory group is excluded first. That is to say, the point-linking trajectories of the current trajectories are grouped first to obtain the current-round classification groups, and then according to the current-round classification group in which the breakpoint trajectory is in the last round (for the convenience of description, this current-round classification group is referred to as a last-round classification group), the current-round classification group that has the highest similarity with the last-round classification group is found out (for the convenience of description, this current-round classification group is referred to as a similar current-round classification group); the breakpoint trajectory is added to the similar current-round classification group; if the current-round classification group with the highest similarity does not exist, then the breakpoint trajectory and any one of the current trajectories in the last-round classification group are divided into one current-round classification group.

"The current-round classification group with the highest similarity" may be the current-round classification group having the largest number of the current trajectories that are identical to the current trajectories in the last round classification group.

Figure 9:
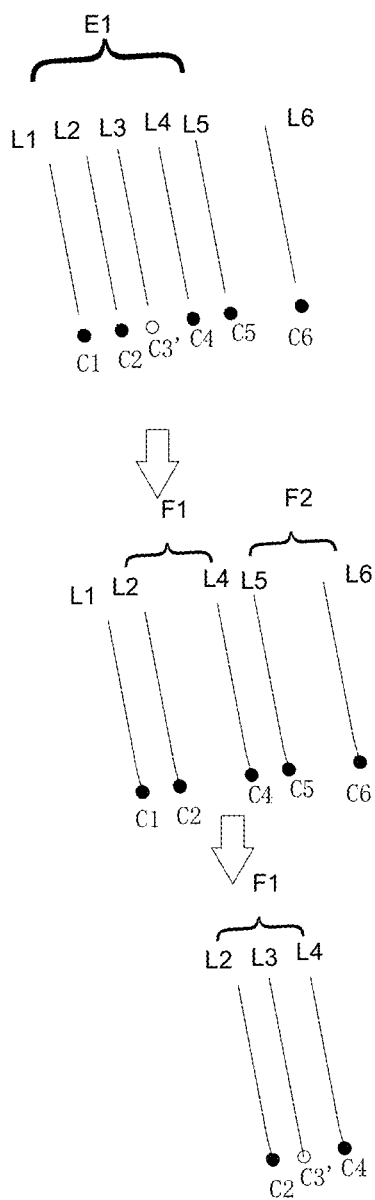
FIG. 9 shows a schematic diagram of a current-round classification group.

For example, referring to FIG. 9, there are six current trajectories L1, L2, L3, L4, L5 and L6, and L1-L5 are in the same current-round classification group (E1). The current touch points C1, C2, C4, C5 and C6 are obtained, wherein C1 corresponds to L1; C2 corresponds to L2; C4 corresponds to L4; C5 corresponds to L5; C6 corresponds to L6, i.e., L1, L2, L3, L4, L5 and L6 are the point-linking trajectories, and L3 is the breakpoint trajectory. The compensation point C3' of L3 is obtained according to the above step S500, and each current trajectory is updated, so at this time, the trail trajectory point and the previous trajectory point of each current trajectory are changed; the updated L1-L6 are grouped; during the classification, because L3 is the breakpoint trajectory in the last round, L3 is excluded first to obtain the current-round preliminary group; the members of the current-round preliminary group are L1, L2, L4, L5 and L6, and L1, L2, L4, L5 and L6 are divided; it is assumed that L1 is not in any current-round classification group, L2 and L4 are in a same current-round classification group (the current-round classification group F1), and L5 and L6 are in another same current-round classification group (the current-round classification group F2), so that the current-round classification groups are updated; meanwhile, the current-round classification group E1 in the last round becomes the last-round classification group E1; it may be seen that there are two current-round classification groups, and these two current-round classification groups are compared with the last-round classification group E1; it is found that there are two current trajectories in F1 corresponding to the current trajectories in the last-round classification group E1, and there is one current trajectory in F2 corresponding to the current trajectory in the last-round classification group E1; therefore, the current-round classification group F1 is taken as the similar classification group, and the breakpoint trajectory L3 is added to F1, so that F1 eventually comprises three current trajectories L2, L3 and L4.

Continuing with the above embodiment, when L1, L2, L4, L5 and L6 are divided, if L1 and L2 are in one current-round classification group (the current-round classification group F3), and L4, L5 and L6 are in one current-round classification group (the current-round classification group F4). Meanwhile, there are two current trajectories in F3 corresponding to E1, and there are two current trajectories in F4 corresponding to E1. Then, the breakpoint trajectory L3 may be randomly added to one of the current-round classification groups, i.e., L3 may be added to F3, or may be added to F4. If L1, L2, L3, L4, L5 and L6 each are found independent when L1, L2, L3, L4 and L5 are divided, i.e., none of L1, L2, L3, L4 and L5 is in the current-round classification group, the breakpoint trajectory may be divided with any one current trajectory of L1, L2, L4 and L5 into one current-round classification group.

During the classification, each current-round classification group has a specific label. According to the setting, the label of the current-round classification group is associated with the label of a specific current trajectory in the current-round classification group, for example, the label of the current-round classification group is associated with the current-round classification group of the current trajectory with the smallest sequence number in the current-round classification group. Therefore, "the current-round classification group with the highest similarity" may be a current-round classification group which the specific current trajectory in the last-round classification group is in; if the specific current trajectory is not in any current-round classification group, then the breakpoint trajectory and the specific current trajectory are divided into one current-round classification group.

For example, using an embodiment shown in FIG. 9 as an example, the current trajectory with the smallest sequence number in the last-round classification group E1, so that L1 is the specific current trajectory; when the current-round classification group is divided, the current-round classification group where L1 is located is determined; if there is an current-round classification group comprising L1, then the breakpoint trajectory L3 is added to the current-round classification group having L1; if there is no current-round classification group having L1, L1 and L3 are divided into the current-round classification group.

It may be seen that the breakpoint trajectory is added to one current-round classification group in any case, so that it is ensured that the preceding compensation point of the breakpoint trajectory may be determined if the breakpoint trajectory is subsequently remained not to obtain the current touch point matched therewith.

For the first sub-condition, the first preset area 1 may be rectangular, or may be circular.

Figure 6:
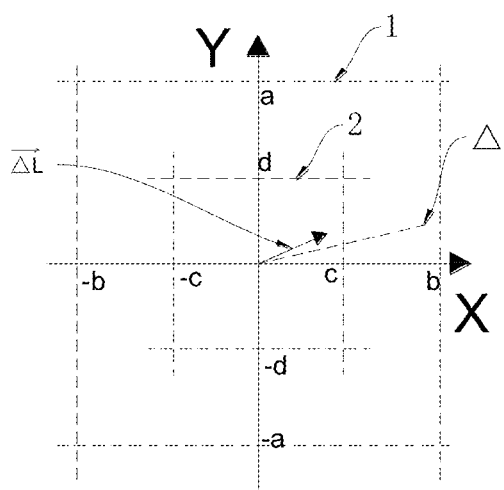
FIG. 6 shows a schematic diagram that both the first preset area and the second preset area are rectangle.

Referring to FIG. 6, in the embodiment in which the preset area 1 is a rectangle, an edge of a rectangle area is parallel to the X-axis or the Y-axis, and a center point of the rectangle area is located at the origin of the coordinate axis. At this time, the rectangle area is enclosed by four straight lines, which are $y=-a$, $y=a$, $x=-b$ and $x=b$ respectively. In an example that the coordinate of the trail trajectory point of the first trajectory is A1 (x1, y1), the coordinate of the previous trajectory point is B1 (x2, y2), the coordinate of the trail trajectory point of the second trajectory is A2 (x3, y3), the coordinate of the previous trajectory point is B2 (x4, y4), and the difference of two trail trajectory points is A (x3−x1, y3−y1), if $-b \leq x3-x1 \leq b$ and $-a \leq y3-y1 \leq a$, then the first sub-condition is satisfied; otherwise, the first sub-condition is not satisfied.

Therefore, when two current trajectories corresponding to two trajectory vectors are satisfied the following conditions, the last trajectory points of two current trajectories corresponding to two trajectory vectors is located in the first preset area 1:

The absolute value of the X-coordinate difference of two last trajectory points is smaller or equal to the first preset value, and the absolute value of the Y-coordinate difference of those is smaller or equal to the second preset value.

Herein, the first preset value is the foregoing b, and the second preset value is the foregoing a, and the first preset value and the second preset value may be equal or not equal. Preferably, the first preset value is equal to the second preset value, the first preset value and the second preset value are the preset specific value, and the first preset value and the second preset value ranges from 50-300 mm, e.g., 50 mm, 80 mm, 100 mm, 150 mm, 180 mm, 200 mm, 230 mm, 260 mm, 300 mm, etc.). The specific value of the first preset value and the second preset value is merely an exemplary description, and may be set autonomously according to requirements in actual application, and the specific value may be outside the foregoing value range.

It may be seen that, it only need to be determined whether the absolute value of the X-coordinate difference of two trail trajectory points is smaller than or equal to the first preset value or not, and whether the absolute value of the Y-coordinate difference of those is smaller than or equal to the second preset value, so that it may be determined whether two trail trajectory points satisfy the first sub-condition without any complicate calculation, the process for step S300 being accelerated, and the time required for the current-round classification group being reduced.

In an embodiment in which the first preset area 1 is circular, a center of the circular first preset area 1 is located at the origin of the coordinate axis, and a boundary of the first preset area 1 may be expressed as $x^2+y^2=r^2$. Taking that the difference between the trail trajectory points is Δ (x3−x1, y3−y1) as an example, x3−x1 is substituted for x, and y3−y1 is substituted for y, so that the value of $(x3-x1)^2+(y3-y1)^2$ is calculated; if the value is larger than $r^2$, then the first sub-condition is not satisfied; if the value is smaller than $r^2$, then the first sub-condition is satisfied; herein, r is a preset value, and in a range of 50-300 mm, e.g., 50 mm, 80 mm, 100 mm, 150 mm, 180 mm, 200 mm, 230 mm, 260 mm, and 300 mm.

By this way, the distance between two trail trajectory points may be directly expressed, and the actual distance is compared with the preset value r, so that whether the two tail trajectory points meet the first sub-condition or not is determined, and therefore the distance relationship between the trail trajectory points of the two mutually determined current trajectories is more explicitly determined.

For the second sub-condition, the second preset area 2 may be rectangular, or may be circular.

Referring to FIG. 6, in an embodiment in which the second preset area 2 is rectangular, a center of the second preset area 2 is located at the origin of the coordinate axis, and the second preset area 2 may be enclosed by four straight lines $x=-c$, $x=c$, $y=-d$ and $y=d$. Taking that the difference $\overline{\Delta L}$ of two trajectory points is (x3−x4−x1+x2, y3−y4−y1+y2) as an example, the magnitude of the x-component is |x3−x4−x1+x2|, the magnitude of the y-component is |y3−y4−y1+y2|; if $-c \leq x3-x4-x1+x2 \leq c$ and $-d \leq y3-y4-y1+y2 \leq d$, then $\overline{\Delta L}$ is located in the second preset area 2; otherwise, $\overline{\Delta L}$ is located outside the second preset area 2. That is to say, if |x3−x4−x1+x2|≤c and |y3−y4−y1+y2|≤d, then the second sub-condition is satisfied; otherwise, the second sub-condition is not satisfied.

Therefore, if the difference of two trajectory vectors satisfy the following condition, then the two trajectory vectors are in the second preset area 2:

the modulus of the x-component of the vector difference of the two trajectory vectors is less than or equal to the third preset value, and the modulus of the y-component of it is less than or equal to the fourth preset value.

Herein, the third preset value corresponds to the foregoing c; the fourth preset value corresponds to the foregoing d; the third preset value and the fourth preset value may be equal or not equal. Preferably, the third preset value is equal to the fourth preset value, and the third preset value and the fourth preset value are the preset specific value, and are in a range of 0.5-3 mm, e.g., 0.5 mm, 0.8 mm, 1 mm, 1.50 mm, 1.8 mm, 2 mm, 2.3 mm, 2.6 mm, 3 mm. The specific values of the third preset value and the fourth preset value are merely exemplary descriptions, and may be set autonomously according to requirements in actual application, and the specific value may be outside the foregoing value range.

It may be seen that, it only need to be determined whether the two components of the trajectory vector are less than or equal to the corresponding preset value or not, so that it may be determined whether the trajectory vectors of two current trajectories satisfy the second sub-condition without any complicate calculation, the process for step S300 is accelerated, and the time required for the current-round classification group is reduced.

In an embodiment in which the second preset area 2 is circular, using that the trajectory vector difference $\overline{\Delta L}$ of two current trajectories is (x3−x4−x1+x2, y3−y4−y1+y2) as an example, if the modulus of $\overline{\Delta L}$ is less than or equal to the radius of the second preset area 2, then $\overline{\Delta L}$ satisfies the second sub-condition; otherwise, the second sub-condition is not satisfied. The radius of the second preset area 2 is the preset value, and ranges from 0.5-3 mm, e.g., 0.5 mm, 0.8 mm, 1 mm, 1.50 mm, 1.8 mm, 2 mm, 2.3 mm, 2.6 mm, 3 mm and so on.

Before step S500, the present application further comprises:

S400, a step for determining a terminated trajectory: determining whether a preset number of last trajectory points of each of the breakpoint trajectories are the compensation points or not; if yes, determining the breakpoint trajectory where a preset number of last trajectory points all are the compensation points as a terminated trajectory, and performing the compensation step on another breakpoint trajectory; otherwise, performing directly the compensation step.

It is determined whether a preset number of last trajectory points of each breakpoint trajectory all are the compensation points. If a preset number of last trajectory points of a certain breakpoint trajectory all are the compensation points, it indicates that the breakpoint trajectory is caused by the user actively lifting the hand, and then the breakpoint trajectory does not need to be drawn continuously. The breakpoint trajectory is set as a terminated trajectory, which means that if a new current touch point is obtained later, the current touch point is no longer matched with the terminated trajectory, so that the terminated trajectory basically does not change.

"Preset number" in "the trajectory point of the last preset number" is preset, and normally may be 2, 3, 4 and 5.

Figure 8:
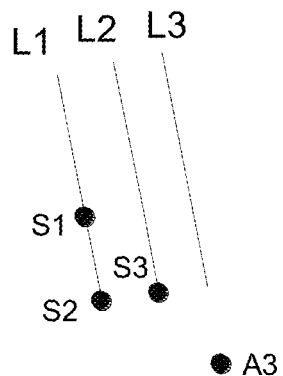
FIG. 8 shows a schematic diagram that there are two compensation points in breakpoint trajectories.
Figure 8:
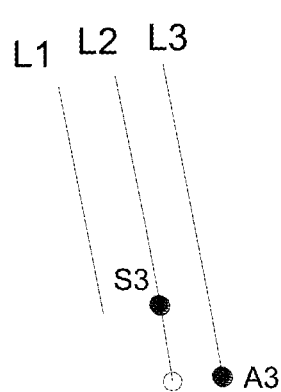

For example, referring to FIG. 8, the current trajectory group comprises the current trajectories L1, L2 and L3 in the same current-round classification group, and further comprises the current touch point A3 matched with L3. Therefore, L1 and L2 are the breakpoint trajectories; L3 is the point-linking trajectory; L1 comprises the first link portion, the compensation point S1 and the compensation point S2; L2 comprises the second link portion and the compensation point S3. If the preset number in step S400 is 2, then it is determined that only L1 satisfies the condition and thus is the terminated trajectory because the last two trajectory points in L1 are the compensation points while only the last trajectory point in L2 is the compensation point. For L2, it is determined whether L2 remains a breakpoint trajectory in the next step S200; if L2 is still a breakpoint trajectory, then L2 already has two compensation points, and L2 is set as a terminated trajectory in the next step S400; if L2 is a point-linking trajectory, L2 is processed according to step S600.

The present application determines the terminated trajectory by determining whether the trajectory point of the last preset number in the breakpoint trajectories is the compensation point or not, so that the determination way is simplified, and whether the user actively lifts a hand leading to a breakpoint may be actively detected; therefore, the breakpoint trajectory caused by actively lifting a hand being set as the terminated trajectory, so that the compensation points of these end trajectories do not need to be calculated in step S500; not only is the calculation amount of the electronic device reduced, but the updating accuracy of the current trajectory group is improved.

For step S600, step S600 may further comprise:
eliminating the terminated trajectory, adding each last trajectory point to the current trajectory matched therewith, displaying the tracked trajectory of the current trajectory, updating the current trajectory group, and returning to the obtaining step.

In step S600, eliminating the terminated trajectory means that the current trajectory corresponding to the terminated trajectory is removed from the current trajectory group, but users may see the terminated trajectory by the electronic device. However, when a new current touch point is obtained later, the current touch point will not be matched with the terminated trajectory. Meanwhile, each of the remaining current trajectories has a corresponding last trajectory point (for a breakpoint trajectory, the last trajectory point is the compensation point corresponding to the breakpoint trajectory, and for a point-linking trajectory, the last trajectory point is the current touch point corresponding to the point-linking trajectory), and each current trajectory and the corresponding last trajectory point are linked to form a respective tracked trajectory, so that each current trajectory is updated, thereby updating the current trajectory group to get ready for the next step S300.

In another embodiment, the compensation point of the breakpoint trajectory may not be displayed by the electronic device, but is only matched with the breakpoint trajectory first. Only when the breakpoint trajectory is matched with the current touch point corresponding to it, the breakpoint trajectory is linked with the compensation point and the current touch point corresponding to it. Therefore, step S600 may further comprise:

a first sub-step S610: determining whether the last one trajectory point of each current trajectory in the current trajectory group excluding the breakpoint trajectory is a compensation point or not; if no, displaying the tracked trajectory of the current trajectory according to the last trajectory point matched therewith; if yes, displaying the tracked trajectory of the current trajectory according to each compensation point, which are contiguous at last, of the current trajectory and the last trajectory point matched with the current trajectory;

a second sub-step S620: eliminating the terminated trajectory, adding each last trajectory point to the current trajectory matched therewith, updating the current trajectory group, and returning to the obtaining step.

In step S610, it is determined whether the original trail trajectory point of each point-linking trajectory is a compensation point or not; if it is not the compensation point, the current touch point matched with the point-linking trajectory is linked with the trail trajectory point of the point-linking trajectory, so that it is implemented that the point-linking trajectory is updated, and the tracked trajectory is displayed; if it is the compensation point, it indicates that the point-linking trajectory includes two parts, one is a link portion (corresponding to a breakpoint trajectory) on which a link has been formed before, and a compensation point corresponding to the link portion, because the point-linking trajectory has a corresponding current touch point, it indicates that the point-linking trajectory is not a real break line, the link portion, the compensation point and the current touch point are linked, so that the current trajectory is updated and the tracked trajectory is displayed.

Figure 10:
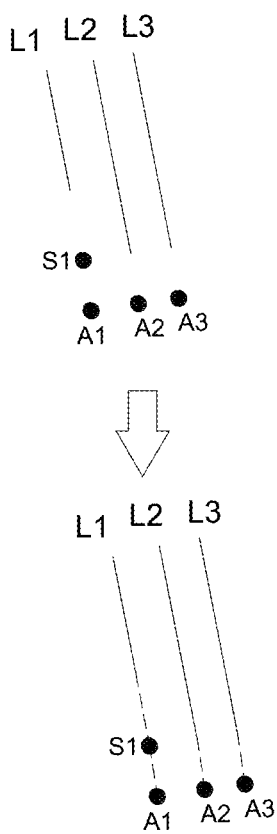
FIG. 10 shows a schematic diagram of updating and displaying a point-linking trajectory.

For example, referring to FIG. 10, the current trajectory group comprises the current trajectories L1, L2 and L3, and the current touch points comprise A1, A2 and A3, wherein L1 comprises the link portion and the compensation point S1 corresponding to it; A1 is matched with L1; A2 is matched with L2; A3 is matched with L3. In step S610, the link portion in L1 is linked with the compensation point S1, and the compensation point S1 is linked with A1, so that L1 is updated and the corresponding tracked trajectory is displayed; L2 is linked with A2, and L3 is linked with A3, so that the tracked trajectories corresponding to L2 and L3 each are displayed.

In step S620, each remaining current trajectory has a last trajectory point corresponding to it (for a breakpoint trajectory, the last trajectory point is the compensation point corresponding to it; for a point-linking trajectory, the last trajectory point is the current touch point corresponding to it), so that each current trajectory is updated so as to implement the update of the current trajectory group (the update of the breakpoint trajectory means that the compensation point is matched with the breakpoint trajectory, but is not displayed, and is not linked with the breakpoint), thereby being prepared for the next step S300.

The present application further relates to a multi-trajectory breakpoint processing system for performing the above breakpoint tracking method, and the system comprises:

an obtaining module for receiving a current touch signal for tracking a current trajectory group and obtaining a plurality of current touch points according to the current touch signal, wherein the current trajectory group comprises a plurality of current trajectories;

a determination module for determining whether each of the current trajectories in the current trajectory group has a matched current touch point or not, and taking each of the current touch points as a last trajectory point of the current trajectory matched therewith if it is determined that each of the current trajectories in the current trajectory group has a matched current touch point; otherwise, determining that the current trajectory having no matched current touch point is a breakpoint trajectory and executing a compensation step;

a compensation module for determining a current-round classification group which a trajectory vector of the breakpoint trajectory is in, determining a compensation point matching the breakpoint trajectory according to at least one of the current trajectories having the matched current touch point in the current-round classification group and the current touch point matched therewith, and taking to the compensation point as a last trajectory point of the breakpoint trajectory;

an update module for adding each of the last trajectory points to the current trajectory matched therewith to update the current trajectory group, and returning to the obtaining step;

wherein the obtaining module, the compensation module and the update module each are connected with the determination module.

In the compensation module, the trajectory vector is a vector determined by the last two trajectory points of the current trajectory where the trajectory vector is from; the plurality of current trajectories in the current trajectory group form at least one current-round classification group; the trajectory vectors in a same current-round classification group form an association chain, and any two adjacent trajectory vectors in the association chain satisfy a preset condition comprising that: the last trajectory points of the two current trajectory corresponding to the two current trajectory vectors are located in a first preset area, and a difference of the two current trajectory vectors is located in a second preset area.

In some embodiments, the compensation module further forms a calculation vector according to the last trajectory point of the matched current trajectory and the current touch point matched therewith for each of the matched current trajectories, calculates a mean value of the calculation vectors as a tracking vector, takes a start point of the tracking vector as a current last trajectory point of the breakpoint trajectory, and takes an end point of the tracking vector as the compensation point of the breakpoint trajectory.

In some embodiments, the compensation module further selects two trajectory vectors satisfying the preset condition from the trajectory vectors that are not grouped, groups the two trajectory vectors into one current-round classification group, selects other trajectory vectors one by one, and adds any one of the other trajectory vectors to the current-round classification group if it is determined that such a trajectory vector is able to satisfy the preset condition with reference to at least one of the trajectory vectors in the current-round classification group; otherwise, takes it as the trajectory vector that is not grouped.

In some embodiments, the compensation module further forms a current-round preliminary group excluding the current trajectory that has the compensation point as the last trajectory point, selects two trajectory vectors satisfying the preset conditions from the trajectory vectors that are not grouped in the current-round preliminary group, and groups the two trajectory vectors into one current-round classification group; the compensation module further selects other trajectory vectors in the current-round preliminary group one by one, and adds any one of the other trajectory vectors to the current-round classification group if it is determined that such a trajectory vector is able to satisfy the preset condition with reference to at least one of the trajectory vectors in the current-round classification group; otherwise, takes it as the trajectory vector that is not divided; and the compensation module further determines a last-round classification group which the current trajectory having the compensation point as the last trajectory point is in, compares the last-round classification group with the current-round classification group, determines the current-round classification group having the highest similarity with the last-round classification group, and adds the current trajectory having the compensation point as the last trajectory point to the current-round classification group having the highest similarity with the last-round classification group; wherein the last-round classification group is one of the current-round classification groups in a last round.

In some embodiments, in the compensation module, it is determined that the last trajectory points of two current trajectories corresponding to two trajectory vectors is located in the first preset area if the two current trajectories corresponding to the two trajectory vectors satisfy the following condition: an absolute value of the difference between X coordinates of the two last trajectory points is less than or equal to a first preset value, and an absolute value of the difference between Y coordinates of the two last trajectory points is less than or equal to a second preset value.

In some embodiments, in the compensation module, it is determined that two current trajectory vectors are in the second preset area if a vector difference between the two current trajectory vectors satisfies the following condition: a magnitude of the x-component of the vector difference between the two trajectory vectors is less than or equal to a third preset value, and a magnitude of the y-component of the vector difference is less than or equal to a fourth preset value.

In some embodiments, the multi-trajectory breakpoint processing system further comprises a module for determining a terminated trajectory. The module is configured to determine whether a preset number of last trajectory points of each of breakpoint trajectories are the compensation point or not, and take any one of the breakpoint trajectories as a terminated trajectory if it is determined that the preset number of last trajectory points of such a breakpoint trajectory all are the compensation point and performing the compensation step on the other breakpoint trajectories; or the module is configured to directly perform the compensation step if it is determined that none of the breakpoint trajectories have a preset number of last trajectory points that are the compensation point.

The determination module is connected with the compensation module by the module for determining the terminated trajectory.

The update module is specifically configured to add each last trajectory point to the current trajectory matched therewith, display a tracked trajectory of the current trajectory, and update the current trajectory group.

The present application further relates to an interactive display screen, and the interactive display screen comprises the above multi-trajectory breakpoint processing system.

The present application further relates to a non-transient computer-readable storage medium, such as a chip, a CD and so on. An executable program is stored on the non-transient computer-readable storage medium, and the breakpoint tracking method is performed when the executable program is executed.

Regardless of the multi-trajectory breakpoint processing system, the interactive large display screen, or the non-transient computer-readable storage medium, the foregoing multi-trajectory breakpoint tracking method may be implemented, and a specific process of the breakpoint tracking method has been described, which is not described herein again.

It should be noted that the non-transient computer-readable storage medium in embodiments of the present application is not limited by the above provided embodiments, for example, the non-transient computer-readable storage medium may be electronic, magnetic, optical, electromagnetic, infrared or any semiconductor system, apparatus or device, or any combination thereof. A specific example of the non-transient computer-readable storage medium may include, but be not limited to: an electronic connection having one or more wires, a portable computer diskette, a hard disk, a random access memory (RAM), a read-only memory (ROM), an erasable programmable read-only memory (EPROM or a Flash memory), an optical fiber, a compact disc read-only memory (CD-ROM), an optical processor, a magnetic processor, or any suitable combination of the foregoing. In embodiments of the present application, the non-transient computer-readable storage medium may be any tangible media containing or storing a program which may be used by an instruction execution system, apparatus or device or incorporated thereto.

Those skilled in the art may understand that each of the above preferable solutions may freely combined and superimposed without any conflict. The flowcharts and block diagrams in the accompanying drawings illustrate architectures, functions and operations that may be implemented according to the systems, methods and computer program products of the various embodiments of the present disclosure. At this point, each block in the flowcharts or block diagrams may represent a module, a program segment, or part of codes, wherein the module, program segment, or part of codes contain one or more executable instructions for implementing a prescribed logic function. It should also be noted that, in some alternative implementations, the functions denoted by the blocks may occur in a sequence different from the sequences shown in the accompanying drawings. For example, two blocks shown in succession may, in fact, be performed substantially concurrently, or the blocks may sometimes be performed in the reverse order, specifically depending upon the functionality involved. It should also be noted that each block in the block diagrams and/or flowcharts as well as a combination of blocks in the block diagrams and/or flowcharts may be implemented using a dedicated hardware-based system executing specified functions or operations, or by a combination of dedicated hardware and computer instructions. The numbers of the steps herein are only for convenience of description and reference, and are not intended to limit the order before and after, and the specific execution order is determined by the technology itself, and those skilled in the art may determine various allowed and reasonable orders according to the technology itself.

Those skilled in the art may understand that each of the above preferable solutions may freely combined and superimposed without any conflict.

It should be understood that the foregoing embodiments are merely exemplary and not restrictive, and that various obvious or equivalent modifications or substitutions that can be made by those skilled in the art with respect to the foregoing details without departing from the basic principles of this application will all be included in the claims of this application.

What is claimed is:

1. A multi-trajectory breakpoint tracking method, comprising:
    an obtaining step: receiving a current touch signal for tracking a current trajectory group and obtaining a plurality of current touch points according to the current touch signal, wherein the current trajectory group comprises a plurality of current trajectories;
    a determination step:
        determining whether each of the current trajectories in the current trajectory group has a matched current touch point,
        taking each of the current touch points as a last trajectory point of the current trajectory matched therewith if each of the current trajectories in the current trajectory group has a matched current touch point, and
        determining that the current trajectory having no matched current touch point is a breakpoint trajectory and executing a compensation step if at least one of the current trajectories in the current trajectory group has no matched current touch point;
    the compensation step:
        determining a current-round classification group in which a trajectory vector of the breakpoint trajectory is, the trajectory vector being a vector determined by the last two trajectory points of the current trajectory where the trajectory vector is from,
        determining a compensation point matching the breakpoint trajectory according to at least one of the current trajectories having the matched current touch point in the current-round classification group and the current touch point matched therewith, and
        taking the compensation point as a last trajectory point of the breakpoint trajectory,
        wherein the plurality of current trajectories in the current trajectory group form at least one current-round classification group, trajectory vectors of the current trajectories in a same current-round classification group form an association chain, and any two adjacent trajectory vectors in the association chain satisfy a preset condition that the last trajectory points of two current trajectories corresponding to the two current trajectory vectors are located in a first preset area and that a difference of the two current trajectory vectors is located in a second preset area; and
    an update step: adding each of the last trajectory points to the current trajectory matched therewith to update the current trajectory group, and returning to the obtaining step.

2. The multi-trajectory breakpoint tracking method according to claim 1, wherein in the compensation step, under a condition that the current-round classification group in which the trajectory vector of the breakpoint trajectory is located has a plurality of the current trajectories matching the current touch point, the determining a compensation point comprises:

for each of the matched current trajectories, forming a calculation vector according to the last trajectory point of the matched current trajectory and the current touch point matched therewith;

calculating a mean value of the calculation vectors as a tracking vector; and taking a start point of the tracking vector as a current last trajectory point of the breakpoint trajectory and taking an end point of the tracking vector as the compensation point of the breakpoint trajectory.

3. The multi-trajectory breakpoint tracking method according to claim 1, wherein the multi-trajectory breakpoint tracking method comprises a grouping step for grouping trajectory vectors into the current-round classification group, the grouping step comprising:

selecting two trajectory vectors satisfying the preset condition from the trajectory vectors that are not grouped, and grouping the two trajectory vectors into one current-round classification group;

selecting other trajectory vectors one by one, and adding any one of the other trajectory vectors to the current-round classification group if it is determined that such a trajectory vector is able to satisfy the preset condition with reference to at least one of the trajectory vectors in the current-round classification group; otherwise, taking it as the trajectory vector that is not grouped.

4. The multi-trajectory breakpoint tracking method according to claim 1, wherein the multi-trajectory breakpoint tracking method comprises a grouping step for grouping trajectory vectors into the current-round classification group, the grouping step comprising:

forming a current-round preliminary group excluding the current trajectory that has the compensation point as the last trajectory point, selecting two trajectory vectors satisfying the preset conditions from the trajectory vectors that are not grouped in the current-round preliminary group, and grouping the two trajectory vectors into one current-round classification group;

selecting other trajectory vectors in the current-round preliminary group one by one, and adding any one of the other trajectory vectors to the current-round classification group if it is determined that such a trajectory vector is able to satisfy the preset condition with reference to at least one of the trajectory vectors in the current-round classification group; otherwise, taking it as the trajectory vector that is not grouped;

determining a last-round classification group in which the current trajectory having the compensation point as the last trajectory point is, and comparing the last-round classification group with the current-round classification group, determining the current-round classification group having the highest similarity with the last-round classification group, and adding the current trajectory having the compensation point as the last trajectory point to the current-round classification group having the highest similarity with the last-round classification group, wherein the last-round classification group is one of the current-round classification groups in a last round.

5. The multi-trajectory breakpoint tracking method according to claim 1, wherein it is determined that the last trajectory points of two current trajectories corresponding to two current trajectory vectors is located in the first preset area if the two current trajectories corresponding to the two trajectory vectors satisfy the following condition:

an absolute value of the difference between X coordinates of the two last trajectory points is less than or equal to a first preset value, and an absolute value of the difference between Y coordinates of the two last trajectory points is less than or equal to a second preset value.

6. The multi-trajectory breakpoint tracking method according to claim 1, wherein it is determined that two current trajectory vectors are in the second preset area if a vector difference between the two current trajectory vectors satisfies the following condition:

a magnitude of an x-component of the vector difference between the two trajectory vectors is less than or equal to a third preset value, and a magnitude of a y-component of the vector difference is less than or equal to a fourth preset value.

7. The multi-trajectory breakpoint tracking method according to claim 1, wherein before the compensation step, the multi-trajectory breakpoint tracking method further comprises:

a determination step for determining a terminated trajectory: determining whether a preset number of last trajectory points of each of the breakpoint trajectories are the compensation point or not, and taking any one of the breakpoint trajectories as a terminated trajectory if it is determined that the preset number of last trajectory points of such a breakpoint trajectory all are the compensation point and performing the compensation step on the other breakpoint trajectories; or performing directly the compensation step if it is determined that none of the breakpoint trajectories have a preset number of last trajectory points that are the compensation point; and wherein the update step comprises eliminating the terminated trajectory, adding each last trajectory point to the current trajectory matched therewith, displaying the tracked trajectory of the current trajectory, updating the current trajectory group, and returning to the obtaining step.

8. A multi-trajectory breakpoint processing system, comprising a processor, a memory and computer program modules stored in the memory and runnable on the processor, wherein the computer program modules comprise:

an obtaining module for receiving a current touch signal for tracking a current trajectory group and obtaining a plurality of current touch points according to the current touch signal, wherein the current trajectory group comprises a plurality of current trajectories;

a determination module for determining whether each of the current trajectories in the current trajectory group has a matched current touch point, taking each of the current touch points as the last trajectory point of the current trajectory matched therewith if each of the current trajectories in the current trajectory group has the matched current touch point, and determining that the current trajectory having no matched current touch point is a breakpoint trajectory if at least one of the current trajectories in the current trajectory group has no matched current touch point;

a compensation module for determining a current-round classification group in which a trajectory vector of the breakpoint trajectory is, the trajectory vector being a vector determined by the last two trajectory points of the current trajectory where the trajectory vector is from, determining the compensation point matching the breakpoint trajectory according to at least one of the current trajectories having the matched current touch point in the current-round classification group and the current touch point matched therewith, and taking the compensation point as the last trajectory point of the breakpoint trajectory, wherein the plurality of current trajectories in the current trajectory group form at least one current-round classification group, trajectory vectors of the current trajectories in a same current-round classification group form an association chain, and any two adjacent trajectory vectors in the association chain satisfy a preset condition that the last trajectory points of two current trajectories corresponding to the two current trajectory vectors are located in a first preset area and that a difference of the two current trajectory vectors is located in a second preset area;

an update module for adding each of the last trajectory points to the current trajectory matched therewith to update the current trajectory group, and returning to the obtaining step;

wherein the obtaining module, the compensation module and the update module each are connected with the determination module.

9. An interactive large display screen comprising the multi-trajectory breakpoint processing system according to claim 8.

10. A non-transient computer-readable storage medium, having an executable program stored thereon, which performs the breakpoint tracking method according to claim 1 when the executable program is executed.

11. The multi-trajectory breakpoint tracking method according to claim 2, wherein it is determined that the last trajectory points of two current trajectories corresponding to two trajectory vectors is located in the first preset area if the two current trajectories corresponding to the two trajectory vectors satisfy the following condition:

an absolute value of the difference between X coordinates of the two last trajectory points is less than or equal to a first preset value, and an absolute value of the difference between Y coordinates of the two last trajectory points is less than or equal to a second preset value.

12. The multi-trajectory breakpoint tracking method according to claim 3, wherein it is determined that the last trajectory points of two current trajectories corresponding to two trajectory vectors is located in the first preset area if the two current trajectories corresponding to the two trajectory vectors satisfy the following condition:

an absolute value of the difference between X coordinates of the two last trajectory points is less than or equal to a first preset value, and an absolute value of the difference between Y coordinates of the two last trajectory points is less than or equal to a second preset value.

13. The multi-trajectory breakpoint tracking method according to claim 4, wherein it is determined that the last trajectory points of two current trajectories corresponding to two trajectory vectors is located in the first preset area if the two current trajectories corresponding to the two trajectory vectors satisfy the following condition:

an absolute value of the difference between X coordinates of the two last trajectory points is less than or equal to a first preset value, and an absolute value of the difference between Y coordinates of the two last trajectory points is less than or equal to a second preset value.

14. The multi-trajectory breakpoint tracking method according to claim 2, wherein it is determined that two current trajectory vectors are in the second preset area if a vector difference between the two current trajectory vectors satisfies the following condition:

a magnitude of an x-component of the vector difference between the two trajectory vectors is less than or equal to a third preset value, and a magnitude of a y-component of the vector difference is less than or equal to a fourth preset value.

15. The multi-trajectory breakpoint tracking method according to claim 3, wherein it is determined that two current trajectory vectors are in the second preset area if a vector difference between the two current trajectory vectors satisfies the following condition:

a magnitude of an x-component of the vector difference between the two trajectory vectors is less than or equal to a third preset value, and a magnitude of a y-component of the vector difference is less than or equal to a fourth preset value.

16. The multi-trajectory breakpoint tracking method according to claim 4, wherein it is determined that two current trajectory vectors are in the second preset area if a vector difference between the two current trajectory vectors satisfies the following condition:

a magnitude of an x-component of the vector difference between the two trajectory vectors is less than or equal to a third preset value, and a magnitude of a y-component of the vector difference is less than or equal to a fourth preset value.

17. The multi-trajectory breakpoint tracking method according to claim 2, wherein before the compensation step, the multi-trajectory breakpoint tracking method further comprises:

a determination step for determining a terminated trajectory: determining whether a preset number of last trajectory points of each of the breakpoint trajectories are the compensation point or not, and taking any one of the breakpoint trajectories as a terminated trajectory if it is determined that the preset number of last trajectory points of such a breakpoint trajectory all are the compensation point and performing the compensation step on the other breakpoint trajectories; or performing directly the compensation step if it is determined that none of the breakpoint trajectories have a preset number of last trajectory points that are the compensation point; and wherein the update step comprises eliminating the terminated trajectory, adding each last trajectory point to the current trajectory matched therewith, displaying the tracked trajectory of the current trajectory, updating the current trajectory group, and returning to the obtaining step.

18. The multi-trajectory breakpoint tracking method according to claim 3, wherein before the compensation step, the multi-trajectory breakpoint tracking method further comprises:

a determination step for determining a terminated trajectory: determining whether a preset number of last trajectory points of each of the breakpoint trajectories are the compensation point or not, and taking any one of the breakpoint trajectories as a terminated trajectory if it is determined that the preset number of last trajectory points of such a breakpoint trajectory all are the compensation point and performing the compensation step on the other breakpoint trajectories; or performing directly the compensation step if it is determined that none of the breakpoint trajectories have a preset number of last trajectory points that are the compensation point; and wherein the update step comprises eliminating the terminated trajectory, adding each last trajectory point to the current trajectory matched therewith, displaying the tracked trajectory of the current trajectory, updating the current trajectory group, and returning to the obtaining step.

19. The multi-trajectory breakpoint tracking method according to claim 4, wherein before the compensation step, the multi-trajectory breakpoint tracking method further comprises:

a determination step for determining a terminated trajectory: determining whether a preset number of last trajectory points of each of the breakpoint trajectories are the compensation point or not, and taking any one of the breakpoint trajectories as a terminated trajectory if it is determined that the preset number of last trajectory points of such a breakpoint trajectory all are the compensation point and performing the compensation step on the other breakpoint trajectories; or performing directly the compensation step if it is determined that none of the breakpoint trajectories have a preset number of last trajectory points that are the compensation point; and wherein the update step comprises eliminating the terminated trajectory, adding each last trajectory point to the current trajectory matched therewith, displaying the tracked trajectory of the current trajectory, updating the current trajectory group, and returning to the obtaining step.

* * * * *